Sept. 8, 1964   D. A. RICHARDSON ET AL   3,148,043
MOISTURE AND PARTICLE REMOVING MEANS FOR ENGINES
Filed March 29, 1962
FIG. 1
FIG. 5
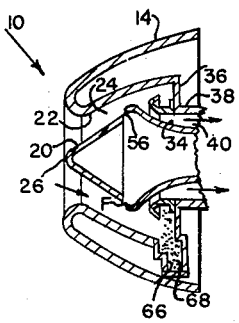
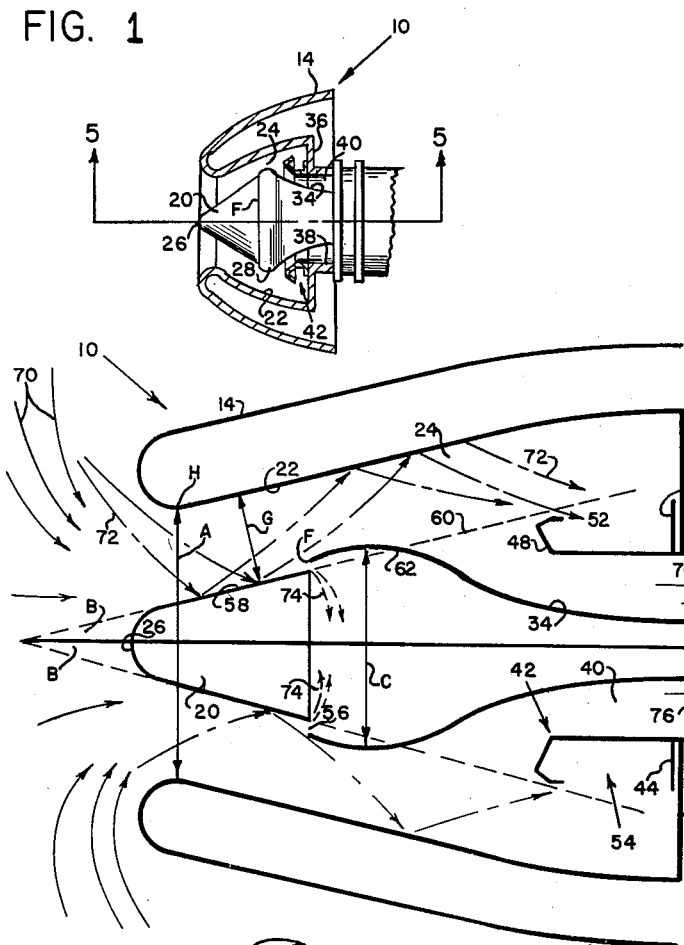
FIG. 2
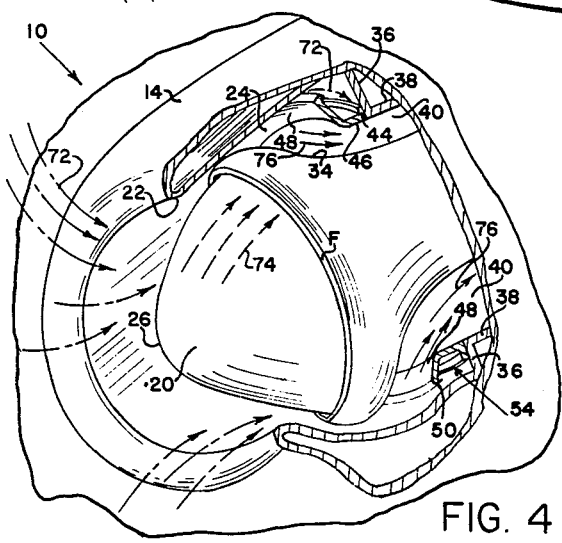
FIG. 4
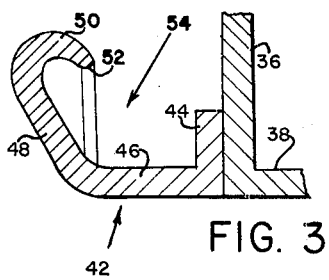
FIG. 3
DAVID A. RICHARDSON
WILLIAM G. WILKINS
INVENTORS
BY Frank C. Leach Jr.
ATTORNEY 3,148,043
MOISTURE AND PARTICLE REMOVING
MEANS FOR ENGINES
David A. Richardson, Wayne, and William G. Wilkins, Clifton Heights, Pa., assignors to The Boeing Company, Seattle, Wash., a corporation of Delaware
Filed Mar. 29, 1962, Ser. No. 183,641
10 Claims. (Cl. 55—306)

This invention relates to separating means for an air stream and, more particularly, is directed to new and novel means for removing deleterious bodies and substances from the intake air stream of gaseous power plants such as jet or turbine engines though not limited to such applications.

The ingestion of foreign particles and moisture into gas turbine or jet engines is a most serious problem since foreign particles, such as dirt, sand, water, and the like, materially shorten the life of various elements of the engine, for example, the blades of the compressor. Such foreign particles or moisture can cause multitudinous damage, such as pitting, corrosion, fouling of various engine parts, and other serious problems.

The problem of ingested foreign particles and moisture is universal to all types of jet or gas turbine engine usages; however, the problem is particularly troublesome in helicopter applications. The unique hovering characteristics and ability to land and take-off from most any type of terrain or body of water makes the jet or gas turbine powered helicopter particularly susceptible to the aforementioned problems created by particles and moisture.

Thus, if a helicopter were to hover, land, or take-off from a body of salt water, the ingestion of salt water is the result with salt being deposited on the compressor blades causing performance losses. Similarly, if the helicopter is operated from land bases, such as beaches, fields, mountainous terrain, or the like, the engine intake will be contaminated by an ingestion of dirt, small particles of stone, sand, or similar material with the consequent result of serious pitting, fouling, or in some instances the initiation of fractures to delicate precision elements of the engine.

Evident of the recognition of some of the aforementioned problems and typical prior art efforts to solve them are United States Letters Patent No. 2,944,731 issued to Howard Kastan and United States Letters Patent No. 2,997,229 issued to Dick Quan. The patent to Quan is directed to and discloses means for separating moisture from a surface traversed by a gaseous flow, thereby indicating that Quan recognized the detrimental effects of moisture on a turbine engine. The patent to Kastan provides a novel trap or sump that is an external appendage to the turbine or jet engine having an opening into the intake air stream duct of the engine. The Kastan device is primarily directed to the collection of relatively large or heavy materials such as sticks, loose bolts, hail stones, and like debris. The very weight of this debris will cause it to be dragged along the lower end of the intake air duct from which it will fall, by gravity, into the debris collecting sump.

The present novel invention also recognizes the problems aforesaid and offers a unique and novel means for effectively and concomitantly preventing the admission of both moisture and small extremely deleterious foreign particles into the engine system. Further, the novel structure herein disclosed offers unique means for simultaneously removing both moisture and foreign particles from the intake air with a minimum of structure and with an absolute minimal loss of efficiency or engine power.

This dual result is obtained by new and novel structure mounted wholly within the engine intake air duct, without impeding intake air flow, and well forward of any delicate moving parts of the engine. Further, this novel structure is constructed and located in recognition of the existence or lack thereof of a coefficient of restitution in the bodies to be removed. Thus, as will hereinafter become readily apparent, there is herein disclosed a unique and novel invention that will effectively remove moisture and foreign particles from the intake air of a power plant such as jet or turbine engines, that is simple in construction, inexpensive to manufacture, highly efficient in its operation, and that minimally lessens the efficiency or power of the engine.

It is a primary object of the present invention to provide novel means for removing moisture and foreign particles from the air intake of a power plant such as a jet or turbine engine well before the air stream reaches the delicate moving parts of the engine.

Another object of the present invention is to provide new and novel structure for separating foreign particles and moisture from the air intake of a power plant such as a turbine engine in which the novel structure takes advantage of the presence or lack of presence of a coefficient of restitution in the substances to be removed.

An additional object of the present invention is to provide novel structure that functions with and makes use of the cowl and cone structure of a jet or turbine engine intake, well forward of the engine elements, for separating moisture and foreign particles from the intake air stream with minimal loss of efficiency or power of the engine.

Yet a further object of the present invention is to provide the intake of a gaseous power plant such as a jet or turbine engine with a pair of novel collector elements, within the intake duct space well forward of the engine elements, which efficiently removes moisture and foreign particles from the intake air stream.

Still an additional object of the present novel invention is to provide a novel moisture collecting annulus incorporated in the intake cone of a jet or turbine engine, and a novel annular debris collector ring mounted in a predetermined relationship with the engine cowl and cone, well forward of the moving elements of the engine.

Still another object of the present invention is to provide an annular lip on the cone in the intake of a jet or turbine engine to collect moisture from the intake air, and an annular collector ring aft of the cone and in a predetermined relationship with the engine cowl and cone, whereby air borne particles are rebounded from the cone and inner surface of the cowl and into the annular collector ring, thereby removing deleterious particles from said air before the intake air reaches the operational portion of the engine.

These and other objects of the present novel invention will readily appear from a reading of the following detailed description when read in conjunction with the attached drawing wherein:

FIGURE 1 is a fragmentary plan view of a gas turbine type engine, partially broken away to show the novel collector element;

FIGURE 2 is a schematic view of the intake of a turbine engine showing the relationships of the various elements of the novel separator means of this invention, and graphically showing the path of moisture and deleterious particles into the moisture separator and particle collector, respectively;

FIGURE 3 is a fragmentary cross sectional view of a portion of the novel particle collector ring of the present novel invention showing the details of construction thereof;

FIGURE 4 is a fragmentary perspective view of the intake end of a turbine engine with the cowl element partially broken away to further show the relationship of the various elements of the novel collector and separator of the present invention; and FIGURE 5 is a fragmentary sectional view taken essentially along the line 5—5 of FIGURE 1 showing the carry off duct for carrying off the deleterious particles collected in the collector ring.

Referring to the drawing, wherein like numerals indicate like parts, the numeral 10 generally indicates a gas turbine engine. Since this invention is directed to novel means for separating moisture and debris from the intake air before it reaches the operational portion of the turbine, only those portions of the turbine engine pertinent to this invention are illustrated in detail and will be described.

As clearly seen in the drawing, the turbine 10 is provided with a cowling portion 14, which defines an intake opening, through which the intake air for turbine 10 is drawn. Mounted within the cowl 14 is a cone member 20, which is well known in the turbine or jet engine construction. The cone 20 and inner surface 22 of the cowl 14 define an annular passage 24 through which the intake air passes. It will be noted that the cone 20 increases in diameter from its point or apex 26 to a maximum diameter 28 within the cowl 14, and further that the inner surface 22 of the cowl 14 also similarly increases in diameter as it extends inboard. Thus, the annular air intake space is of ever increasing diameter as the passage progresses inboard.

Beyond diameter 28 of the cone 20 the cone assumes a reverse conical construction and decreases in diameter in a smooth curve as indicated by the numeral 34. The inner surface 22 of the cowl 14 is vertically inwardly disposed at its inner end, as indicated by the numeral 36, and then horizontally bent to define a collar or sleeve portion 38. The collar or sleeve portion 38 together with the surface 34 of the cone 20 serve to define a second annular passage 40, which is of, or located at, a lesser diameter with respect to the annular passage 24.

Mounted on the outboard or leftmost face of part 36, as viewed in FIGURE 1, is an annular receptacle 42 for collecting or receiving separated dirt, debris, or the like, the function of which will readily become apparent hereinafter. As also clearly seen in FIGURE 1, the annular collector ring 42 is mounted on the part 36 on the same diameter as the collar or sleeve portion 38 and with the sleeve portion 38 helps to define the annular passage 40.

Referring to FIGURE 3, there is shown, in cross section, an enlarged portion of the collector ring 42, the details of which will now be described with reference to parts shown in other figures. An annular flange 44 is fixedly secured to the part 36 as by welding or other suitable means. Extending outboard (to the left, as viewed in FIGURE 3) from the flange 44 is a horizontally disposed portion 46 of essentially the same diameter as the sleeve portion 38. At the end of the collar portion 46, the collector ring 42 is angularly disposed or bent diametrically outwardly as at 48, extending toward the inner surface 22 of the cowl 14, and the very end thereof is reversely bent inboard horizontally as at 50 terminating in a lip portion 52. The configuration of the collector ring 42 essentially defines an annular chamber or trap 54 for debris and the overlying portion 50 and the lip 52 effectively prevent particles collected therein from escaping into the intake air as will hereinafter readily appear.

Referring to FIGURES 1, 2, and 4, the details of the moisture collecting structure of the cone 20 will now be particularly described. As clearly seen in FIGURE 2, the cone 20 is provided with an annular opening 56 inboard of its tip 26 and approximately adjacent its maximum diameter 28. Moisture in the intake air, having no coefficient of restitution, will strike the cone and essentially adhere thereto and move inboard along the cone surface and pass through the opening 56, which has a lip F, as will hereinafter be described and will readily appear.

As is seen, the lip F on cone 20 is at a greater diameter than the cone surface 58 to the left thereof so that the opening 56 is essentially directly in the path of the cone surface 58, extended. It has been found that the width of the opening 56 will give optimum efficiency when about one-tenth of an inch (.10″).

With continued reference to FIGURE 2, the maximum diameter C of the cone 20 is designed to be not less than 75% of the initial or opening diameter A of the turbine intake. The relationship of diameter C to diameter A helps to properly control the directional flow of the intake air from its original inward path toward the cone to a reverse or outward path toward the inner surface 22 of the cowl 14.

Further, the acute angle B, which designates the angle of inclination of the surface 58 of the cone 20, also determines the location of the collector ring 42. It has been found for optimum efficiency that the collector ring 42 must lie within the acute angle B; in other words, a line of the surface 58 extended, as indicated by broken line 60, will pass between the collector ring 42 and the inner surface 22 of the cowl 14.

Additionally, the width of the annular passage 24, between surfaces 58 and 22 designated by the letter G. shall not be greater than the straight line distance connecting points H and F, H being the point of the initial opening diameter of the engine intake. It also has been determined for the maximum effectiveness in collecting the moisture in the intake air that the lip F should be located forward of the intersection of the acute angle B, extended (broken line 60), with the curved surface 34 as designated by the numeral 62 in schematic drawing FIGURE 2.

In operation, intake air is drawn into the turbine at a relatively high speed. It also has been found that the major volume of the intake air drawn into the turbine actually comes from the area away from the center line of the intake and not on a direct line; the intake air stream being designated by the numeral 70 in FIGURE 2. The effect of this high speed flow of air flowing essentially toward the cone 20 is to impart a centrifuging action to the air and consequently a centrifuging action to any airborne particles. The effective path of particles in the intake air is designated by the heavy dash-dot lines 72 in FIGURE 2.

As clearly shown in FIGURE 2, the air-borne particles strike the surface 58 of the cone 20; the particles then rebound from the surface 58 toward the inner surface 22 of the cowl 14; and next rebound from the inner surface 22 of the cowl 14 toward the receptacle 54 of the collector ring 42. This action of the particles is due to the fact that small air-borne particles have an inherent coefficient of restitution and upon striking a surface with a relatively high velocity will rebound from the surface. Of course, depending upon the angle of incidence, the angle of reflection from the surface 58 of the cone 20 will vary; thus some of the particles will rebound directly from the surface 58 into the trap 54 while others will rebound from the surface 58 to the inner surface 22 and therefrom into the receptacle 54.

Once the particles have passed into the receptacle 54 of the collector ring 42, they will accumulate by gravity at the lower end of the collector ring. As disclosed in FIGURE 5, the lower end of the turbine engine is provided with a duct 66, which opens towards the mouth of receptacle 54, and the collected particles 68 pass from the receptacle 42 into the duct 66, and from the duct to a suitable collecting container (not shown), which can be conveniently removed from the turbine engine when filled.

With this novel means of separating deleterious particles from the intake air, it has been found that ninety percent (90%) of the more harmful particles in the intake air having a size of 25 microns or greater are removed with a total intake loss of efficiency not exceeding six-tenths percent (0.6%). Thus, the air traveling into the operational portion of the engine designated by the numeral 76 is ninety percent purified of harmful patricles of the order of 25 microns or greater.

Moisture in the intake air, designated in FIGURE 4 by the numeral 74, also has a centrifuging action imparted thereto by the effect of the high speed in flow of intake air as heretofore described. However, moisture or droplets do not possess an inherent coefficient of restitution so that the net result is that when the moisture particles or droplets strike the surface 58 of the cone 20 the moisture adheres thereto and travels along the surface 58, inboard, with the general inflow of intake air. Thus, moisture striking the surface 58 will travel along the inclined surface 58 of the cone 20; eventually, inward flow will be effectively prevented by the lip F and the opening 56. The moisture and droplets will flow through the opening 56 as indicated by the dash lines designated 74 in FIGURES 2 and 4. Thus, the moisture will pass from the exterior surface 58 of the cone 20 into the interior of the cone 20 where it can be collected by gravity and ducted or drawn off to a suitable container (not shown) essentially similar to that shown in FIGURE 5 for the debris and particles. It has been found, experimentally, with the moisture separator as aforedescribed that 90% to 100% of the droplets on the order of 25 microns in size and greater are effectively removed from the intake air.

Thus, it is readily seen from the foregoing description that there is provided a new, unique, and novel invention for the separation of moisture and debris from the intake air of jet or turbine engines. It also is readily appreciated that this novel invention embodies unique simple structure that makes maximum use of the confined space within the intake opening of jet or turbine engines to provide inexpensive separating means so that no expensive, large, and efficiency reducing appendages need be attached to the external portions of the engine or helicopter.

While the invention has been desribed with respect to members of circular type shape, it should be understood that the members could have other configurations. For example, the cowl 14 and the cone 20 could have a rectangular shape. Thus, the term "annular" in the claims and specification should be understood to mean any passage, which is formed between two spaced members with one surrounding the other, unless specifically directed to members of circular shape.

This invention may be embodied in other forms without departing from the spirit or essential characteristics thereof. The present embodiments are therefore to be considered in all respects as illustrative and not restrictive the scope of the invention being indicated by the appended claims, rather than by the foregoing description, and all changes which come within the meaning and range of equivalency of the claims are therefore intended to be embraced therein.

We claim:

1. In combination, an engine having a first air intake passage defined by spaced inner and outer members mounted on a common axis; a second passage of lesser size than said first intake passage extending inwardly from an innermost end of said first intake passage and connected thereto; said two passages defining a continuous path for engine intake air; barrier means on the periphery of the inner member defining a moisture opening from the exterior thereof to the interior thereof; and collector means mounted within said first intake passage at the juncture of said two passages; said collector means mounted in inwardly spaced relation from said outer member and substantially on the outer wall of said second passage; said inner member diverting the flow of intake air outwardly toward said outer member whereby particles in said intake air rebound from said inner and outer members into said collector means before said intake air reaches the second passage while moisture in the intake air strikes the surface of the inner member and traverses said surface and passes through said moisture opening from the exterior to the interior of said inner member.

2. In combination, an engine having a cowl and an intake cone defining a pair of concentric annular air intake passages; a first of said passages extending inwardly from an open end of said engine a predetermined distance in increasing diameter; the second of said annular passages connected to the innermost end of said first annular passage and extending therefrom into said engine at a lesser diameter than said first annular passage; barrier means on the circumference of said cone defining a moisture opening from the exterior thereof to the interior thereof; an annular collector member mounted at the innermost end of said first annular passage substantially at the juncture of said two annular passages and in spaced relation to said cowl whereby intake air drawn into said first annular passage toward said cone is diverted outwardly therefrom and thence to said second annular passage and particles in said intake air rebound successively from said cone and cowl and into said collector member while moisture in said intake air strikes the surface of said cone and traverses said surface and passes through said moisture opening from the exterior to the interior of said cone.

3. In combination, an engine having a first air intake passage defined by spaced inner and outer members mounted on a common axis; a second passage of lesser size than said first intake passage connected thereto and extending inwardly from an innermost end of said first passage; said passages defining a continuous path for intake air to said engine; said inner member having angulated sides increasing in inclination within said outer member; collector means mounted within said first passage at the juncture of said two passages and lying wholly within an extension of the angle of inclination of said inner member with respect to the center line of the engine; said collector means also mounted in spaced relation to said outer member whereby inflowing intake air carrying deleterious particles traversing from said first passage toward said second passage will strike said inner and outer members and the particles therein will successively rebound therefrom and into said collector means.

4. In combination, an engine having a first annular air intake passage defined by concentrically mounted inner and outer members; a second annular passage of lesser diameter than said first annular intake passage connected thereto and extending inwardly from an innermost end of said first annular passage; said annular passages defining a continuous path for intake air to said engine; said inner member having angulated sides increasing in inclination within said outer member; collector means mounted within said first annular passage at the juncture of said two annular passages and lying wholly within an extension of the angle of inclination of said inner member with respect to the center line of the engine; said collector means also mounted in spaced relation to said outer member whereby inflowing intake air carrying deleterious particles traversing from said first annular passage toward said second annular passage will strike said inner and outer members and the particles therein will successively rebound therefrom and into said collector means.

5. In combination, an engine having a circular cowl member; an intake cone, having a predetermined angle of inclination, mounted within and extending inwardly in said cowl; said cowl and cone defining a pair of concentric annular air intake passages; a first of said passages extending inwardly from an open end of said cowl a predetermined distance in increasing diameter; the second of said annular passages, of lesser diameter than said first passage, connected to the innermost end of said first passage and defining therewith a path for the engine intake air; a circumferential lip on and substantially adjacent the maximum diameter of said intake cone defining a moisture opening in said cone connecting the exterior surface with the interior thereof; said lip extending outwardly at a greater diameter than the surface of said cone; an annular collector ring mounted at the juncture of said two annular passages and in spaced relation to said cowl; said collector ring lying within an extension of the angle of inclination of said cone and having an open side facing said cowl; intake air drawn into said engine at high speed successively moves toward said cone and is then diverted toward said cowl before traversing said second annular passage whereby particles in said air rebound from said cone and cowl and into the open side of said collector ring and moisture in the intake air traverses the surface of said cone and passes through the moisture opening from the exterior surface to the interior of said cone.

6. In combination, an engine having an air intake cowl defining a substantially circular opening; an air intake cone, having a predetermined angle of inclination, mounted in said opening and extending inwardly into said cowl; said cowl and cone defining a pair of essentially concentric annular air intake passages for said engine; the maximum diameter of said cone being at least seventy-five percent (75%) of the diameter of said circular opening; a first of said annular passages extending inwardly from an open end of said cone in ever increasing diameter; the second of said annular passages, of lesser diameter than the first annular passage, connected to the first annular passage at an innermost end thereof and defining therewith a path for air intake for said engine; a circumferential lip on and substantially adjacent the maximum diameter of said cone, said lip extending diametrically outwardly beyond the normal angle of inclination of said cone; a moisture opening beneath said lip connecting the exterior surface with the interior of said cone; an annular collector ring mounted within said first annular passage in spaced relation to said cowl substantially at the juncture of said two annular passages; said collector ring having an open side facing said cowl member whereby particles rebounding from said cowl surface at different angles will pass through the open side into said collector ring; said collector ring lying wholly within an extension of the angle of inclination of said cone whereby intake air drawn into said first annular passage at relatively high speed moves successively toward said cone and said cowl before traversing said second annular passage and particles in the intake air rebound successively from said cone and said cowl and into said collector ring while moisture in the intake air, lacking a coefficient of restitution, traverses the surface of said cone and passes through said moisture opening from the exterior to the interior of said cone.

7. The device as set forth in claim 6 wherein the width of the first annular space between the surface of the cone and an adjacent surface of said cowl is less than the distance from a point on said cowl, representing the outermost diameter at the open end of said cowl, and an edge of said lip.

8. In combination, an engine having an open end air intake cowl defining a substantially circular intake opening; and air intake cone mounted in said cowl having its apex at the open end of said cowl and extending into said cowl at a predetermined angle of inclination; said cowl and said cone defining a pair of essentially concentric annular passages for intake air to said turbine engine; an enlarged portion of said cone defining a maximum diameter thereof extending diametrically outwardly and lying at an angle of greater inclination than the angle of inclination of said cone; said maximum diameter being at least seventy-five percent (75%) of the diameter of the open end of said cowl; a circumferential lip on said enlarged portion substantially adjacent the maximum diameter thereof and facing said open end of the cowl; said lip and the cone surface, lying on the angle of inclination of said cone, defining a circumferential moisture opening facing the open end of said cowl; said moisture opening connecting the exterior surface of said cone with the interior thereof; an annular collector ring mounted at the juncture of said two annular passages and in spaced relation to said cowl; said collector ring lying within an extension of the angle of inclination of said cone and having an open side facing said cowl; intake air drawn into said engine at high speed successively moves toward said cone and is then diverted toward said cowl before traversing said second annular passage whereby particles in said air rebound from said cone and said cowl and into the collector ring through said open side, and moisture in the intake air, lacking a coefficient of restitution, traverses the surface of said cone and passes from the exterior surface to the interior thereof through said moisture opening.

9. The device as set forth in claim 8 wherein the width of the first annular space between the surface of inclination of the cone and an adjacent surface of said cowl is less than the distance from a point on said cowl representing the outermost diameter of the cowl at the open end thereof and an edge of said lip.

10. The device as set forth in claim 8 wherein said lip faces the open end of said cowl and lies forward of a point determined by the intersection of an extension of the angle inclination of said cone with said enlarged portion.

References Cited in the file of this patent

UNITED STATES PATENTS

| | | |
|---|---|---|
| 2,158,863 | Randall | May 16, 1939 |
| 2,600,302 | Kinsella | June 10, 1952 |
| 2,616,519 | Crankshaw | Nov. 4, 1952 |
| 2,636,666 | Lombard | Apr. 28, 1953 |